United States Patent [19]

Deming

[11] Patent Number: 4,787,587
[45] Date of Patent: Nov. 29, 1988

[54] UNIVERSAL BRACKET FOR METAL OR WOOD STUDS

[75] Inventor: Dale R. Deming, Pittsburgh, Pa.

[73] Assignee: FL Industries, Inc., Livingston, N.J.

[21] Appl. No.: 106,865

[22] Filed: Oct. 13, 1987

Related U.S. Application Data

[63] Continuation of Ser. No. 7,635, Jan. 28, 1987.

[51] Int. Cl.$^4$ ............................................. A47B 96/00
[52] U.S. Cl. ............................ 248/205.1; 248/DIG. 6
[58] Field of Search ............ 248/205.1, DIG. 6, 27.1, 248/218.4; 220/3.3, 3.5, 3.9, 3.6; 174/58; 52/27

[56] References Cited

U.S. PATENT DOCUMENTS

| | | | |
|---|---|---|---|
| 1,961,728 | 6/1934 | Arnest et al. | 248/DIG. 6 X |
| 2,143,278 | 1/1939 | Myers | 248/DIG. 6 X |
| 2,480,805 | 8/1949 | Buckels | 248/DIG. 6 X |
| 3,360,151 | 12/1967 | Yznaga | 220/3.9 |
| 3,528,636 | 9/1970 | Schmidt | 248/218.4 X |
| 3,588,019 | 2/1971 | Cozeck | 248/228 |
| 3,606,223 | 9/1971 | Havener | 248/205.1 |
| 3,684,230 | 8/1972 | Swanquist | 248/229 |
| 3,730,466 | 5/1973 | Swanquist | 220/3.9 X |
| 3,804,359 | 4/1974 | Cumber | 248/DIG. 6 X |
| 3,977,640 | 8/1976 | Arnold | 248/205.1 |
| 4,135,337 | 1/1979 | Medlin | 52/221 |
| 4,390,105 | 6/1983 | Graves | 220/3.6 |
| 4,447,030 | 5/1984 | Nattel | 248/27.1 |
| 4,603,789 | 8/1986 | Medlin | 220/3.5 X |

*Primary Examiner*—J. Franklin Foss
*Attorney, Agent, or Firm*—Elliott Olstein; Raymond Lillie

[57] ABSTRACT

A bracket for mounting an outlet box to a stud comprising a first flat portion including at least one opening for receiving a fastener or fastening means, a second flat portion located in a plane at an angle to the plane in which the first flat portion is located, and a third flat portion forming an angle with the second flat portion and at least a portion of which is capable of being severed from the bracket. Preferably, the second flat portion is located in a plane at a right angle to the plane in which the first flat portion is located, and the third flat portion forms an obtuse angle with the second flat portion. The bracket can be used with metal or wood studs and can be secured to either the open or the closed end of a stud.

2 Claims, 3 Drawing Sheets

UNIVERSAL BRACKET FOR METAL OR WOOD STUDS

This is a continuation of application Ser. No. 7,635 filed Jan. 29, 1987, now abandoned.

This invention relates to a bracket for mounting outlet boxes also known as junction boxes, or "J-Boxes," to metal or wood studs. More particularly, this bracket can be mounted or installed on the open or closed side of a stud.

Brackets for mounting outlet boxes to studs are known in the art. The brackets of the prior art do have shortcomings, however. The stud of the prior art are usually adapted to be installed on a specific type of bracket. Most are adapted either for installation on metal studs or on wood studs, but not on both types of studs. The brackets of the prior art also are adapted to be installed on either the closed or the open side of a stud, but in most cases they cannot be installed on both the closed or open side of the stud. The bracket of the present invention can be installed on either a metal or a wood stud, as well as being capable of being installed on the closed or open side of a stud.

The bracket of the present invention comprises a first flat portion including at least one opening for receiving a fastener, a second flat portion located in a plane at an angle to the plane in which said first flat portion is located, said second flat portion capable of being attached to an outlet box, and a third flat portion forming an angle with said second flat portion and at least a portion of said third flat portion is capable of being severed from said bracket. There is at least one score line for severing at least a portion of said third flat portion from said bracket. In one embodiment, the bracket includes at least one score line at the junction between the second and third flat portions along which the third flat portion may be severed from the second flat portion. In another embodiment, there is at least one score line located on said third flat portion at a location not at the junction of said second flat portion and said third flat portion. Also in another embodiment, the first flat portion has at least one opening capable of receiving a fastening means. Another preferred embodiment further comprises a notch communicating with said first flat portion and said second flat portion, said notch comprising two essentially perpendicular panels. In another preferred embodiment, said second flat portion is located in a plane at a right angle to the plane in which said first flat portion is located. In addition, the third flat portion preferably forms an obtuse angle with said second flat portion. The above described construction of the bracket enables the bracket to be fitted to or installed on either the closed or the open end of a stud.

The present invention will be further described with respect to the accompanying drawings, wherein.

Figure 4:
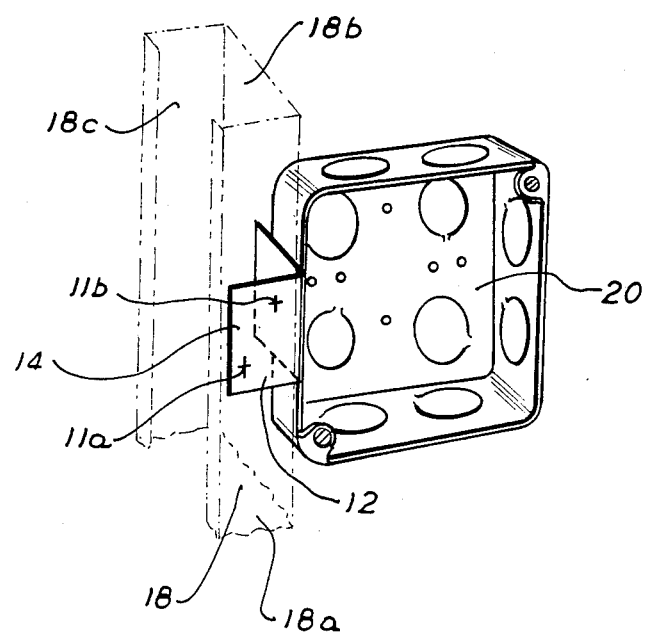
FIG. 4 is a view of said bracket of the present invention holding an outlet box against the closed side of a stud.
Figure 5:
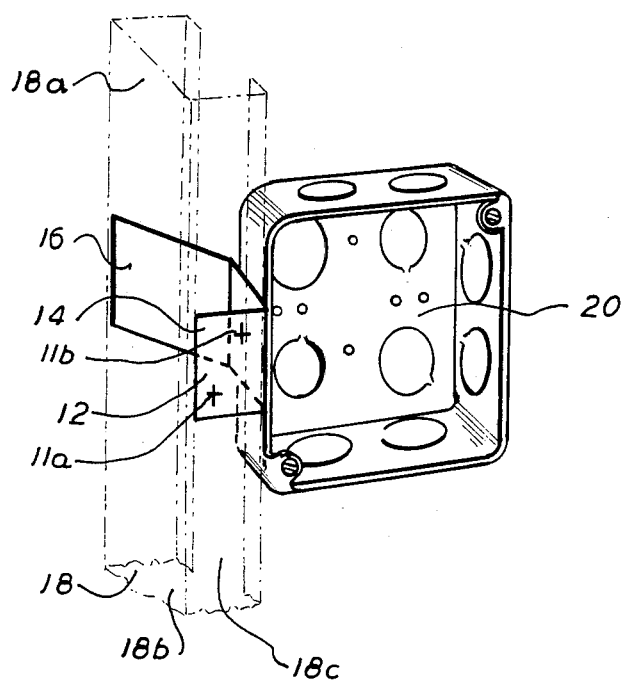
FIG. 5 is a view of a first embodiment of the bracket of the present invention holding an outlet box against the open side of a stud.
Figure 8:
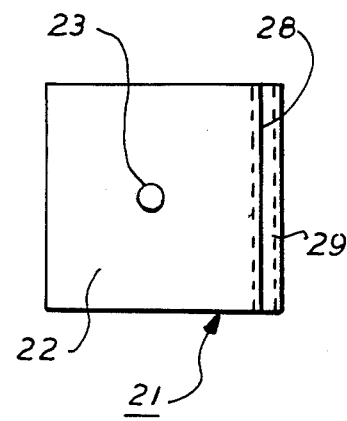
FIG. 8 is a front view of the first flat portion and the notch communicating with the first and second flat portions of said bracket.
Figure 6:
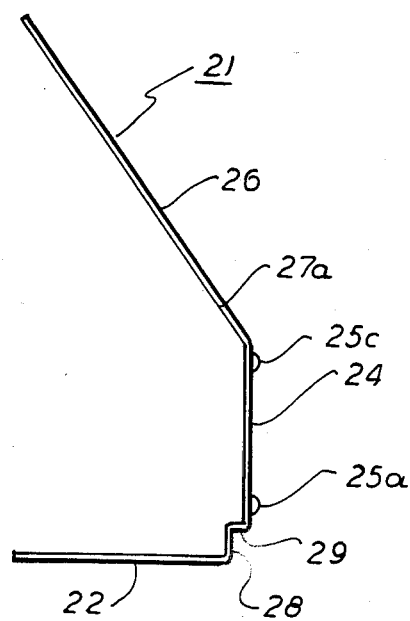
FIG. 6 is an elevational view of another embodiment of the bracket of the present invention.
Figure 7:
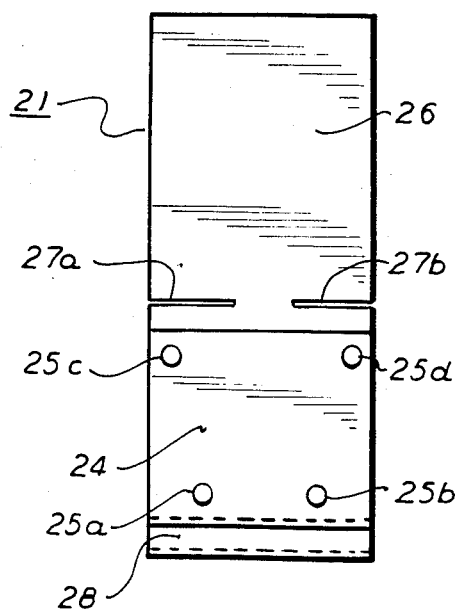
FIG. 7 is a side view of the second and third flat portions of said bracket.
Figure 9:
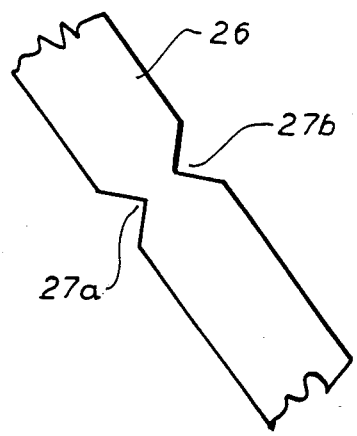
FIG. 9 is a magnified elevational view of the score lines located on the third flat portion of said bracket.

Referring now to the drawings, one embodiment of the bracket 10 of the present invention comprises three flat portions or sides 12, 14, and 16. The first flat portion 12 has at least one opening for receiving a fastener or a fastening means capable of fastening the first flat portion 12 to a side or flange of a stud 18. In the drawings as shown, the first flat portion has openings 11a, 11b for receiving fasteners for fastening the first flat portion 12 to a side 18a or 18c of stud 18. The fasteners may be any fasteners known in the art. Preferably, the fasteners are zip screws. The second flat portion 14 is at a right angle to the first flat portion 12 and is capable of being attached to outlet box 20. The second flat portion 14 may be attached to the outlet box 20 by any means known in the art such as by screws, nuts and bolts, welds, or other means. As shown in FIG. 4, the second flat portion 14 rests against side 18b of stud 18 when the bracket 10 holds an outlet box 20 against the closed side of a stud 18. As shown in FIG. 5, when the bracket 10 holds an outlet box 20 against the open side of a stud 18, the second flat portion is opposite side 18b.

Figure 1:
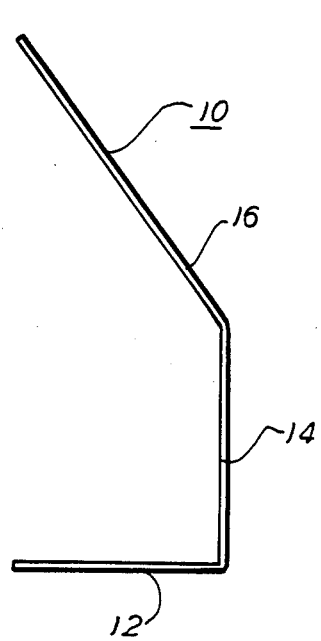
FIG. 1 is a top view of a first embodiment of the bracket of the present invention.
Figure 2:
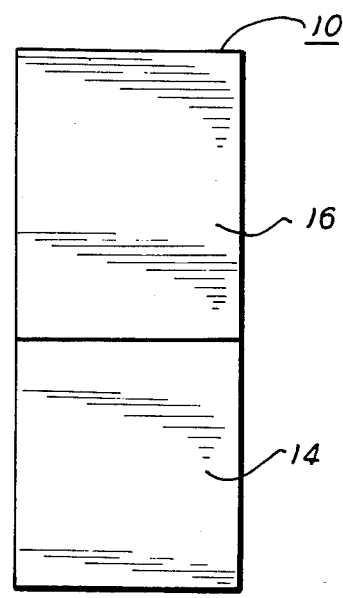
FIG. 2 is a side view of the second and third flat portions of said bracket.
Figure 3:
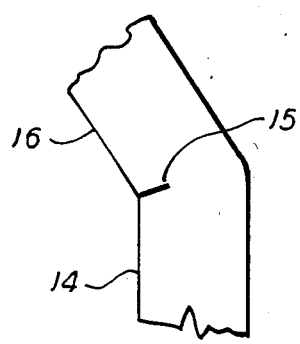
FIG. 3 is a view of the score line at the junction of the second and third flat portions of said bracket.

The third flat portion 16 of the bracket 10 is positioned in such a way that it forms an obtuse angle with second flat portion 14. Referring to FIG. 3, it is also shown that there is a small score line 15 at the junction of second flat portion 14 and third flat portion 16. This score line 15 aids in severing the third flat portion 16 from the second flat portion 14 of the bracket 10.

As shown in FIG. 4, when mounting an outlet box 20 to the closed side of a stud 18, one breaks off or severs the third flat portion 16 from the second flat portion 14 of the bracket 10 along score line 15. The outlet box 20, or junction box or "J-Box," is attached to the second flat portion 14, which is placed next to side 18b of stud 18. The first flat portion 12 of the bracket 10 is next to side 18a of stud 18. To secure the outlet box 20 against stud 18, one inserts fasteners through openings 11a, 11b of first flat portion 12. The fasteners penetrate through the first flat portion 12 of the bracket 10 as well as into or through side 18a of stud 18.

As shown in FIG. 5, when mounting an outlet box 20 against the open side of a stud 18, the third flat portion 16 remains attached to second flat portion 14. Second flat portion 14 is attached to outlet box 20 and is opposite side 18b of stud 18. Fasteners are inserted through openings 11a, 11b of first flat portion 12 and into or through side 18c of stud 18. The end of the third flat portion 16, which functions as a return or support leg, abuts against the corner between sides 18a, 18b of stud 18, thereby holding the bracket 10 and the outlet box 20 rigid while the bracket 10 is being fastened to stud 18.

FIGS. 6 to 11 illustrate another embodiment of the bracket of the present invention. This embodiment 21 comprises a first flat portion 22, a second flat portion 24 located in a plane at a right angle to the plane in which said first flat portion 22 is located, and a third flat portion 26 which forms an obtuse angle with said second flat portion 24. It can also be seen that this bracket further comrpises a notch communicating with said first flat portion 22 and said second flat portion 24. Said notch comprises two essentially perpendicular panels 28, 29. Panel 28 is essentially perpendicular to panel 29 and also essentially perpendicular to first flat portion 22. Panel 28 lies in a plane parallel to the plane in which second flat portion 24 is located. Panel 29 is essentially perpendicular to panel 28 and also essentially perpendicular to second flat portion 24. Panel 29 lies in a plane parallel to the plane in which first flat portion 22 is located.

The third flat portion 26 forms an obtuse angle with the second flat portion 24. Located on the third flat portion 26 is at least one score line. In the embodiment as shown, there are score lines 27a, 27b on each face of the third flat portion 26. A portion of the third flat portion 26 is thereby capable of being severed from the bracket 21 along score lines 27a, 27b. In a preferred embodiment, these score lines are 0.012 inch deep. The score lines, however, can vary in number and thickness from this preferred embodiment as described. The purpose of severing a portion of the third flat portion 26 from the bracket is to enable the mounting of the bracket 21 and outlet or junction box 20 against the closed side of a stud 18.

The mounting of this bracket 21 and a junction box 20 against the closed or open side of a stud is done in a way similar to that of mounting bracket 10 and junction box 20 against a stud 18 as previously described. The bracket 21 is attached to junction box 20 by attaching second flat portion 24 to the outlet or junction box 20 by nails, screws, welds or other fastening means known in the art. In the embodiment shown, the second flat portion 24 is attached to junction box 20 through spot welds at points 25a, 25b, 25c, and 25d.

Figure 10:
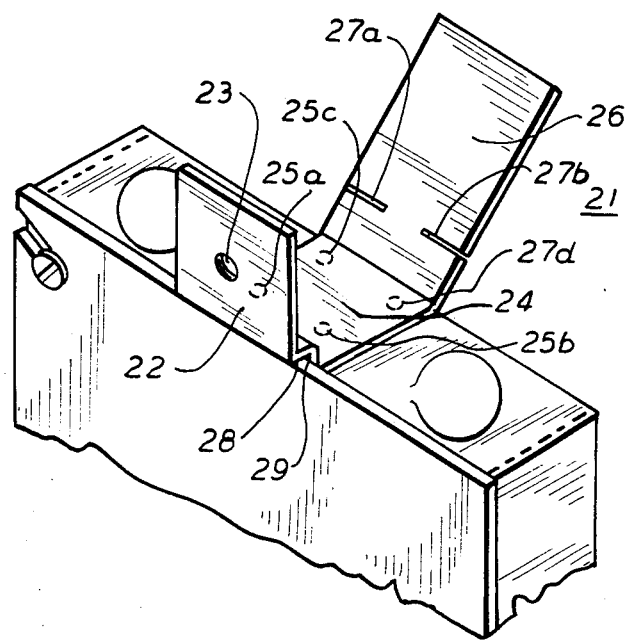
FIG. 10 is a side view of said bracket attached to an outlet box.
Figure 11:
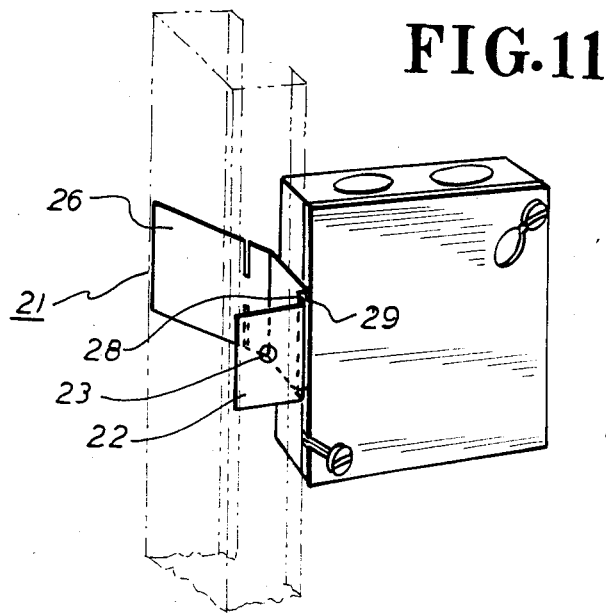
FIG. 11 is a front view of said bracket holding an outlet box against a stud.

In some cases, one may wish to put a cover on the junction box 20 before it is mounted. FIGS. 10 and 11 show a cover 30 affixed to junction box 20 by means of screws 31. It is also shown that the cover 30 is slightly wider than junction box 20. The notch in bracket 21 as defined by perpendicular panels 28, 29 accommodates the excess portion of cover 30. It is also shown that cover 30 is parallel to panel 29 and perpendicular to panel 28. The cover 30 thereby has an excess portion which fits in front of panel 29 and has an edge which is perpendicular to and may abut against a panel 28.

After the bracket 21 is attached to the junction box 20 and either before or after a cover 30 has been affixed to the junction box 20, the junction box 20 and bracket 21 may be mounted against the open or closed side of a stud 18. The bracket 21 is a mounted against the stud 18 by fastening the first flat portion 22 to a side of the stud 18 by using nuts and bolts, screws or other fastening means. In the embodiment shown in FIGS. 8 and 11, first flat portion 22 has an opening 23 capable of receiving a fastening means such as a zip screw. In this way, first flat portion 22 is fastened to a side 18a or 18c of stud 18 similar to the way in which bracket 10 was fastened as shown in FIGS. 4 and 5. When bracket 21 is mounted against the closed side 18b of a stud 18, a part of third flat portion 26 is broken off along score lines 27a, 27b before mounting. The part of the third flat portion 26 that remains attached to bracket 21 abuts against side 18b of stud 18. The first flat portion 22 is mounted against side 18a by inserting fastening means through opening 23. When bracket 21 is mounted against the open side of a stud 18, all of the third flat portion 26 remains attached to the bracket 21. The first flat portion 22 is mounted against side 18c by inserting fastening means through opening 23. The end of third flat portion 26, which acts as a return or support leg, abuts against the corner between sides 18a and 18b of stud 18, thereby holding bracket 21 and outlet or junction box 20 rigid while being mounted against stud 18.

It is to be understood, however, that the bracket of the present invention is not to be limited to the specific embodiments described above. The bracket may be made of any material or materials known in the art. The bracket may be fastened to the stud by any known means in the art, and may be fastened by any number of fasteners. There is also room for variation in the means of attachment of the outlet box to the second flat portion. The stud to which the bracket is fastened may be of metal, wood, or any other acceptable material. The dimensions and configurations of the stud may be other than those particularly described or shown in the drawings and still be within the scope of the accompanying claims.

What is claimed is:

1. An apparatus, comprising:
   a junction box; and
   a bracket attached to said junction box for mounting said junction box, said bracket comprising:
   a first flat portion including at least one opening for receiving a fastening means;
   a second flat portion located in a plane at a right angle to the plane in which the first flat portion is located, said second flat portion being fastened against said junction box;
   a notch located between said first flat portion and said second flat portion, said notch comprising two essentially perpendicular panels; and
   a third flat portion forming an obtuse angle with said second flat portion, said third flat portion including at least one score line for severing a portion of said third flat portion from said bracket.

2. The apparatus of claim 1 wherein said first flat portion of said bracket includes a plurality of openings.

* * * * *